United States Patent Office 3,553,637
Patented Jan. 5, 1971

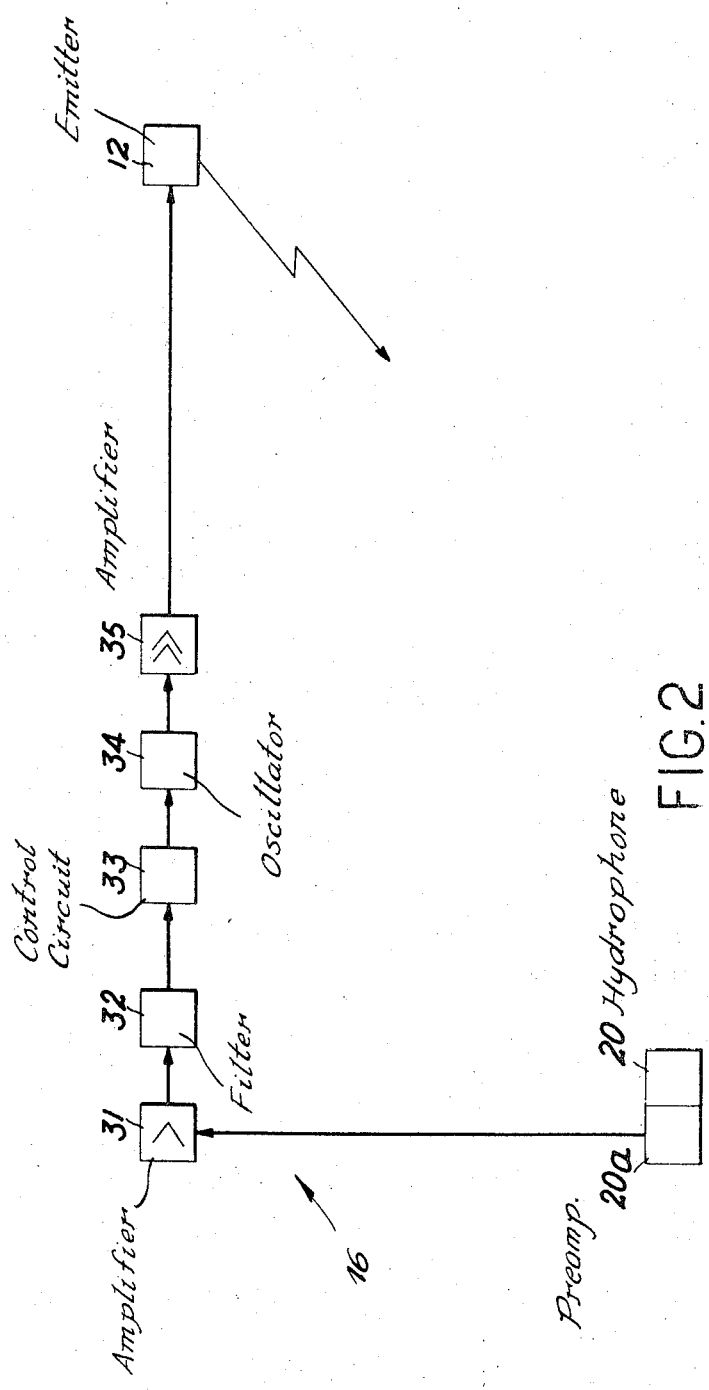

---

3,553,637
METHOD AND APPARATUS FOR MEASURING AND CONTROLLING THE RANGE OF ACOUSTIC EMITTERS
Michel Hanff, Fontenay-le-Fleuri, and Pierre Juhel, Soyaux, France, assignors to Compagnie des Compteurs, Paris, France
Filed Feb. 27, 1969, Ser. No. 802,964
Claims priority, application France, Mar. 5, 1968, 142,398
Int. Cl. B63g 7/08
U.S. Cl. 340—5         14 Claims

ABSTRACT OF THE DISCLOSURE

A method for measuring and controlling the range of an underwater acoustic emitter for sweeping acoustic influence mines and consisting in towing a sound signal emitter at a substantial distance astern of a minesweeper and in towing at least one sound signal receiver at a shorter distance astern which defines a safety zone with respect to the minesweeper and also at a short and constant distance from the sea floor. Essentially, the signal collected by the receiver is utilized for the purpose of modifying at least one of the sweep parameters so that said signal should have a value equal at a maximum to a predetermined value but insufficient to influence a mine which is assumed to be located at the same point as the receiver.

---

This invention relates to a method for measuring and controlling the range of acoustic emitters and apparatus for carrying out the method.

The invention applies more particularly to minesweeping for acoustic influence mines but also extends to other applications involving the range of underwater acoustic emitter in which it may be necessary, for example, to calculate sweep efficiency, to obtain acoustic characteristics within a predetermined zone or to search for a constant emission range in spite of the various propagation phenomena which are encountered.

The most conventional method of minesweeping consists in towing a sweep consisting of an acoustic wave generator at a substantial distance astern of a vessel known as a minesweeper. This generator is immersed at a constant depth and is intended to bring mines to detonation within a predetermined zone of influence in which the threshold of acoustic sensitivity of the mines is attained. It is naturally important to ensure that the minesweeper is located outside the influence zone and that a safety margin is also provided so that the mines located nearest the vessel are induced to explode by means of the sweep without causing destruction or damage to the minesweeper. In this method, the emission of sound waves is set at a level which is either constant or recurrent in time. This level is essentially determined as a function both of the distance from the emitter to the sweeping vessel and of the safety margin which is adopted.

There are, however, two phenomena which call for consideration. In the first place, the depth of the water is variable and, in the second place, the manner of propagation of sound waves is not identical in all locations but is dependent both on the physical and geological nature of the sea bed. In consequence, a mine can be influenced by the emitter at a distance which is liable to vary according to the depth of water and according to nature of the sea bed or the subsoil structure of the sea bed. As a consequence, the dimensions of the zone in which the mines can be influenced by the emitter in respect of a predetermined relative position of this latter are subject to variation along a course followed by the vessel according to the nature of corresponding sea beds and according to the depth of water. In shallow water which provides good conditions of propagation for sound waves and in the case of highly reflecting sea-bed surfaces, for example, it may therefore happen that the band intercepted by the sweep, namely the width of zone in which the sweep has an effective influence on any mines located in that zone, attains and passes beyond the safety zone normally provided for the minesweeper, thereby exposing this vessel to the effects of explosion of mines located in the vicinity.

The aim of this invention is to provide a method which effectively circumvents this disadvantage by making it possible to predict the range of the emitters with respect to receivers or transponders and in particular with respect to acoustic mines which have a wide variety of different characteristics, by making it possible to regulate the emitters in such a manner as to obtain well-defined ranges or alternatively by permitting automatic control of the output level of the emitters in order to obtain relatively constant ranges irrespective of the propagation phenomena which are encountered.

In particular, and in the more specific practical application of clearing acoustic influence mines which rest on a sea floor, the invention is more precisely intended to ensure safety of the vessel used to tow the sweep. This objective is achieved by means of arrangements whereby the level of the sweep can be set at a value such that it cannot cause explosion of mines located in a safety zone around the vessel, no matter what acoustic propagation conditions may be encountered or how deep the water may be.

To this end, the method under consideration consists in towing a sound signal emitter at a substantial distance astern of a minesweeper and in towing at least one sound signal receiver at a shorter distance astern which defines a safety zone with respect to said minesweeper, said receiver being immersed at a short and constant distance from the bottom. Essentially, the method consists in utilizing the signal collected by the receiver for the purpose of modifying at least one of the sweep parameters so that said signal should have a value equal at a maximum to a predetermined value which is insufficient to influence a mine which is assumed to be located at the same point as said receiver.

The term "sweep parameter" designates essentially the emission level and/or the emission frequency or frequency band, the variation of which can be obtained practically instantaneously. However, in the case of emitters which have a constant and fixed level, sweep parameters can consist of different values such as the emitter towing distance, the depth of immersion of the emitter which reduces the emission level as it increases, or the speed of sweep on which the emission frequency is dependent in the case of certain types of towed sweeps.

The method in accordance with the invention can essentially be carried out in two different ways, either for sweeping acoustic mines with variable-level or fixed-level sweeps, or recurrent-level sweeps when minesweeping is undertaken in zones which are unknown from an acoustic standpoint or for the purpose of prospecting a zone in order to define the acoustic properties of this zone.

In the first case, the receiver or hydrophone which is maintained in the vicinity of the bottom receives a signal which is very similar to that which is "heard" by a mine lying on the bottom. Under these conditions, one or a number of receivers which are towed by the minesweeper in the vicinity of the distance astern at which the explosion of a mine no longer endangers the vessel will measure the noise produced by the emitter in this particular zone. The signal received or, in the case of a number of receivers, the strongest of the signals received, is employed for adjusting the level of emission of the emitter or sweep so that the vessel should never be jeopardized by the noise produced by the sweep. Adjustment of the emission level can be carried out either manually as a function of the measured level of reception or preferably automatically, especially by means of a threshold circuit which produces action so as to reduce the emission level as soon as a predetermined reception threshold has been overstepped. Since said reception level also depends on the frequency of the emitted waves, adjustment of the reception level can also be carried out by modifying the frequency, especially by making use of a variable-reactance oscillator.

In the second case, a measurement of the sound level at the receiver can serve to determine the width of the band in which the mines can be influenced by the sweep while minesweeping operations are in progress. In particular, since the majority of mines are of the double influence type, that is to say which are fired by an acoustic and a magnetic signal received simultaneously, it is an advantage to be able to adjust the width of the influence zone of the emitter or acoustic sweep to the width of a magnetic sweep which is towed by the same vessel. With this objective, the level of the sound waves produced by the emitter is controlled in dependence on a value which corresponds to a predetermined reception level at a given distance from the bottom. It is thus possible to maintain substantially constant during the sweeping operation the width of the band which is intercepted by the acoustic sweep and consequently to cause said width to coincide with that of the magnetic sweep, regardless of the nature of the sea bed and the depth of the water. Advantageously, the magnetic sweep which is constituted by a measuring magnetometer can be towed under the same conditions and in the vicinity of one or a number of hydrophones.

The following description of one exemplified embodiment will serve to explain the invention in greater detail within the framework of its particular application to the sweeping of acoustic mines which rest on the sea bed. However, it is to be understood that this application is not given in any sense by way of limitation. Reference will be made to the accompanying drawings, in which:

FIG. 2 is a circuit diagram showing the connection of the different elements of the system.

Figure 1:
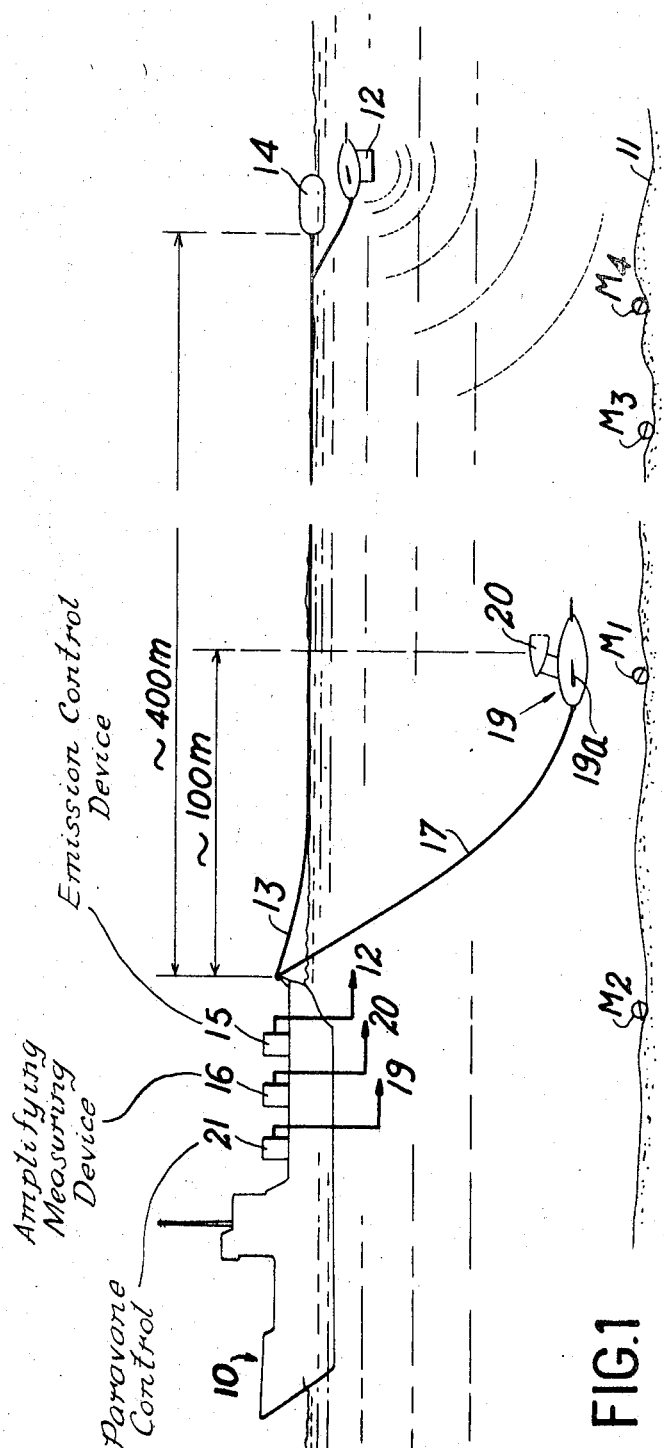
FIG. 1 is a diagram which serves to illustrate the operation of a minesweeping system in accordance with the invention.

Although only a single receiver is shown in these figures for the sake of clarity, it is apparent that a plurality of receivers could be employed under similar conditions and especially in a parallel arrangement. Similarly, in other applications such that the measurement of acoustic ranges or the sweeping of fictitious mines represented by a simulator located on board the ship, the relative arrangement of the emitter and of the receiver or receivers can be reversed, in which case the emitter could be located either in proximity to or on board the ship itself.

In these figures, the reference 10 designates a minesweeper vessel, the reference 11 designates a sea bed and acoustic mines $M_1$, $M_2$, $M_3$ . . ., are shown resting on the bottom. There is also shown a sweep 12 constituted by a sound wave emitter which is immersed at a constant depth at the end of a cable 13, said cable being preferably connected to a float 14 at a relatively substantial distance from the vessel 10 which may be of the order of 400 meters, for example. The emitter 12 is connected electrically to a device 15 for controlling the emission level, said device being placed on board the vessel. A receiver 20 consisting of a hydrophone, for example of the piezoelectric or electrostrictive type, is maintained at a constant and very short distance of the order of a few meters above the sea bed by means of an immersion control device and is connected electrically to an amplifying and measuring device 16 which is mounted on board the vessel 10. The immersion control device consists in particular of a cable 17 which is connected to the vessel and tows a small torpedo-shaped submarine device 19 of the so-called "paravane" type. The paravane 19 is adapted to carry or tow either one or a number of hydrophones 20 and in some cases a magnetic sweep or measuring magnetometer. Said paravane 19 is fitted with movable planes 19a whose angle of inclination can be varied by means of a mechanism (not shown in the drawings) controlled by a motor which is mounted within the interior of the paravane body. Moreover, the paravane 19 is equipped with sounding apparatus permitting of measurement of the distance to the sea bed, this information being intended to control the motor which actuates the planes automatically. In consequence, the hydrophone or hydrophones 20 remain continuously in proximity to the sea floor 11.

The sound signal which is collected by the hydrophone 20 under these conditions is very similar to the signal received by the mine $M_1$ which is lying on the bottom, namely the mine which is located nearest the hydrophone. The signal received by this hydrophone is measured on board the minesweeper vessel by means of the device 16 and is utilized for the purpose of limiting the emission level of the emitter 12 to a value such that said level is insufficient to cause the explosion of mines located at $M_1$ or $M_2$ whereas, on the contrary, mines located at $M_3$, $M_4$ at shorter distances from the emitter are brought to detonation. The mines last mentioned will explode without hazard to the vessel since these mines are located outside a so-called safety zone whose width is precisely a function of the level of the emitter which is regulated by the hydrophone.

In accordance with the invention, the signal which is collected by the hydrophone 20 or in a general manner the signals delivered by a number of hydrophones which are towed close to the bottom at intervals which can vary according to the objective to be achieved can be utilized in a number of different ways.

The simplest solution consists merely in reading the reception level at the output of the device 16 and in reducing the emission level by means of a manual adjustment of the control device 15 when it is observed that the reception level oversteps a threshold at which the emission becomes hazardous and is liable to cause explosion of mines at a distance from the minesweeper which is within the established safety zone limit.

A further solution consists in making the adjustment of the automatic control device automatic by providing at the output of the measuring device 16 a threshold circuit and especially a diode; when the threshold is overstepped, the diode becomes conductive and the resultant signal is applied to the control device 15 so as to reduce the emission level and to restore this latter to a value which no longer endangers the vessel.

A third solution which can be adopted if it is desired to maintain constant the width of band intercepted by the emitter 12 consists in utilizing a servo-system which produces an automatic variation in the level of emission so that the reception level should be maintained constant at a given distance from the emitter with respect to the sea bed. The measured value is supplied by the devices 20 and 16. The index value is determined as a function of the band width to be swept by the emitter, namely the mean radius over which the emitter is efficient. The difference signal between the measured value and the index value is then applied to the input of a control loop which sets the control device 15 so that the reception signal at the previously defined distance from the emitter should remain approximately constant, no matter what nature, state or depth of water may be encountered.

FIG. 2 is a diagram of a circuit for ensuring automatic level control of an emitter or acoustic sweep wherein the same elements are designated by the same reference numerals as in FIG. 1. The device 16 comprises an amplifier 31 connected to a preamplifier 20a which is incorporated in the hydrophone 20 and filters 32 which are tuned to the band in which the sweep emission frequency is located. The control device 15 consists of a control circuit 33 which is coupled to the output of the filters 32 and acts on a low-frequency oscillator 34 in order to modify the level of its oscillations. Said oscillations are amplified in a power amplifier 35 prior to being applied to the emitter 12 which converts them to acoustic waves. In this case, the emitter can advantageously be constituted by an electromagnetic transducer of the type described in U.S. Pat. No. 3,349,366.

It is apparent that, since the reception level is dependent on the frequency of the emitted waves, it is possible to modify not only the emission level but also the emission frequency or on the contrary both emission level and frequency in order to ensure that the reception level should remain either lower than or equal to the predetermined threshold. However, in this case, the control to be achieved becomes more complex. In point of fact, this method is primarily of interest if the curve of acoustic response of the mine or mines to be influenced is already known at least approximately. By then working on the variation in sensitivity of the mine as a function on the one hand of frequency and on the other hand of variations in propagation, it is possible to modify the frequency of an emitter having a non-variable level—which corresponds in particular to one type of acoustic sweep at present in use—for the purpose of ensuring safety of the minesweeper. However, the operations to be performed for this purpose are relatively complicated and the control circuit calls for a computer into which there are fed on the one hand the curves of response of the mine and of the emitter as a function of the frequency and on the other hand the measured attenuations. As a function of these data, the computer determines the frequency to be utilized.

Furthermore, in the case of sweeps which have a non-variable level, the signal of the towed hydrophone or hydrophones can also be employed for the purpose of modifying a sweep parameter other than the level or the frequency such as the towing distance of the emitter, the depth of immersion of the emitter and so forth. Finally, in addition to the uses mentioned above, the hydrophone signal can be applied to electronic circuits on board the minesweeper which serve to simulate the functions of mines of different types. These simulator circuits thus make it possible to calculate in respect of the emitter-receiver distance considered the probabilities of influence on mines which would have corresponding characteristics.

What we claim is:

1. A method for measuring and controlling the range of an underwater acoustic emitter for sweeping acoustic influence mines and consisting in towing a sound signal emitter at a substantial distance astern of a minesweeper and in towing at least one sound signal receiver at a shorter distance astern which defines a safety zone with respect to said minesweeper, said receiver being immersed at a short and constant distance from the bottom, transmitting sound signals from said emitter, receiving said signals at said receiver and modifying a parameter of the transmitted signal in response to the received signal so that said transmitted signal should have a value equal at a maximum to a predetermined value but insufficient to influence a mine which is assumed to be located at the same point as said receiver.

2. A method in accordance with claim 1, characterized in that the sweep parameter to be modified is the emission level.

3. A method in accordance with claim 1, characterized in that the sweep parameter to be modified is the emission frequency which produces action on the emission level.

4. A method in accordance with claim 2, characterized in that adjustment of the emission level is carried out manually.

5. A method in accordance with claim 2, characterized in that adjustment of the emission level is carried out automatically by application of the signal collected by the receiver to a threshold circuit.

6. A method in accordance with claim 2, characterized in that the emission level is controlled in dependence on a value such that the reception level remains constant at a predetermined distance from the emitter relative to the bottom and the width of the band intercepted by the emitter also remains approximately constant.

7. A method in accordance with claim 6, characterized in that the reception level is set at a predetermined threshold by adjusting both the emission level and the emission frequency.

8. A method in accordance with claim 1, characterized in that the sweep parameter to be modified is the distance from the emitter to the minesweeper.

9. A method in accordance with claim 1, characterized in that the sweep parameter to be modified is the depth of immersion of the emitter.

10. A method in accordance with claim 1, characterized in that the sweep parameter to be modified is the speed of the minesweeper.

11. Apparatus for measuring and controlling the range of an underwater acoustic emitter on board a minesweeper comprising an emission-level control device connected to an underwater sound wave emitter which is towed by the minesweeper, control means for controlling the immersion of at least one receiver including means acting on a paravane which is associated with said receiver for maintaining said receiver at a constant distance from the bottom and amplifying and measuring means connected to said receiver for measuring the level of reception by said receiver.

12. Apparatus in accordance with claim 11, characterized in that the emission-level control device comprises threshold means connected to said amplifying and measuring means for reducing the emission level as soon as a predetermined reception level is overstepped.

13. Apparatus in accordance with claim 11, characterized in that the emission control device comprises additional control means connected to said amplifying and measuring means for controlling the emission level in dependence on a value corresponding to a predetermined reception level at a given distance from the bottom.

14. Apparatus in accordance with claim 11, characterized in that the signal collected by said receiver is applied to a mine simulator located on board the minesweeper in order to define continuously the probabilities of influence on a mine which has the characteristics of the simulated type.

References Cited
UNITED STATES PATENTS 3,012,534   12/1961   Thomas _____ 114—235

RICHARD A. FARLEY, Primary Examiner

U.S. Cl. X.R.

114—235